US012275523B2

(12) United States Patent
Vora et al.

(10) Patent No.: US 12,275,523 B2
(45) Date of Patent: *Apr. 15, 2025

(54) INTEGRATED PROPELLER-BOOM FAIRING

(71) Applicant: Wisk Aero LLC, Mountain View, CA (US)

(72) Inventors: Neel Vora, San Mateo, CA (US); Pranay Sinha, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,095

(22) Filed: Feb. 20, 2024

(65) Prior Publication Data

US 2024/0190567 A1 Jun. 13, 2024

Related U.S. Application Data

(63) Continuation of application No. 18/160,101, filed on Jan. 26, 2023, now Pat. No. 11,939,053.

(Continued)

(51) Int. Cl.
*B64C 29/00* (2006.01)
*B64C 29/02* (2006.01)

(52) U.S. Cl.
CPC .......... *B64C 29/0033* (2013.01); *B64C 29/02* (2013.01)

(58) Field of Classification Search
CPC ............... B64C 29/0033; B64C 29/02
See application file for complete search history.

(56) References Cited

U.S. PATENT DOCUMENTS 3,666,209 A * 5/1972 Taylor ................ B64C 29/0033
244/12.4
6,260,793 B1 7/2001 Balayn et al.
(Continued)

FOREIGN PATENT DOCUMENTS

FR 1287816 A 3/1962
GB 2550489 A 11/2017

OTHER PUBLICATIONS

U.S. Appl. No. 18/160,101, "Non-Final Office Action", Jul. 31, 2023, 12 pages.
(Continued)

*Primary Examiner* — Tien Q Dinh
*Assistant Examiner* — William L Gmoser
(74) *Attorney, Agent, or Firm* — Kilpatrick Townsend & Stockton LLP

(57) ABSTRACT

Embodiments provide a VTOL aircraft including a plurality of tilting propeller assemblies each coupled to a support structure and configured to transition between a vertical flight and a forward flight position. Each tilting propeller assembly comprising a propeller and a movable fairing provided downstream of the propeller. The movable fairing is configured to extend along an axis of rotation of the propeller. When the tilting propeller assembly transitions between the vertical and forward flight position, the movable fairing is configured to swivel to extend parallel to the direction of resultant airflow over the tilting propeller assembly into a minimum drag orientation. The movable fairing is damped enough to prevent any oscillations from the propeller wake shedding, and at the same time, keep the propeller aligned in a minimum-drag orientation with the resultant flow.

19 Claims, 13 Drawing Sheets

Related U.S. Application Data

(60) Provisional application No. 63/303,929, filed on Jan. 27, 2022.

(56) References Cited

U.S. PATENT DOCUMENTS

| | | | | |
|---|---|---|---|---|
| 6,328,256 | B1* | 12/2001 | Ryan | B64C 27/322 |
| | | | | 403/150 |
| 7,147,182 | B1* | 12/2006 | Flanigan | B64C 29/0033 |
| | | | | 244/6 |
| 10,589,838 | B1 | 3/2020 | Suppes | |
| 2015/0175260 | A1 | 6/2015 | Hesselbarth | |
| 2016/0083075 | A1* | 3/2016 | Moxon | B64C 3/52 |
| | | | | 244/13 |
| 2016/0101853 | A1 | 4/2016 | Toppenberg | |
| 2016/0288903 | A1 | 10/2016 | Rothhaar et al. | |
| 2018/0370624 | A1 | 12/2018 | Seale et al. | |
| 2020/0239150 | A1 | 7/2020 | Kimchi et al. | |
| 2020/0324894 | A1 | 10/2020 | Fredericks et al. | |
| 2021/0387724 | A1 | 12/2021 | McLaren et al. | |
| 2022/0396355 | A1 | 12/2022 | Depape et al. | |

OTHER PUBLICATIONS

U.S. Appl. No. 18/160,101, "Notice of Allowance", Nov. 20, 2023, 11 pages.

PCT/US2023/011625, "International Search Report and Written Opinion", Apr. 14, 2023, 9 pages.

PCT/US2023/011625, "International Preliminary Report on Patentability", Aug. 8, 2024, 8 pages.

* cited by examiner

INTEGRATED PROPELLER-BOOM FAIRING

CROSS-REFERENCES TO OTHER APPLICATIONS

This application is a continuation of U.S. patent application Ser. No. 18/160,101 filed Jan. 26, 2023, and entitled "Integrated Propeller-Boom Fairing", which claims benefit under 35 USC§ 119(e) to U.S. Provisional Patent Application No. 63/303,929 filed Jan. 27, 2022, and entitled "Integrated Propeller-Boom Fairing", the disclosures of which are incorporated by reference herein in their entirety for all purposes.

BACKGROUND

An aircraft may include tilting fans (e.g., tilting propeller assembly) that may tilt between two positions: a vertical position where the tilting fans are used for forward flight, and a horizontal position where the tilting fans are used for vertical flight to provide lift to the aircraft. The tilting fans may be mounted on one or more booms coupled to a wing for the aircraft. During the vertical flight configuration, the booms are at right angles to the airflow from the tilting propeller assembly(s). When the tilting propeller assembly is in the horizontal position (e.g., tilting propeller assembly is facing upwards), the airflow from the tilting propeller assembly impacts the boom, which in return reduces the efficiency of the tilting propeller assembly by, for example, up to 5-10%.

Hover efficiencies are mostly insensitive to the presence of a nacelle fairing below the propeller disk due to the inboard vortex sheet convecting at a slow rate downstream. At higher flight speeds, a truncated nacelle fairing creates a stagnation pressure bubble which begins to affect the thrust and torque of the propeller, leading to inefficiencies. In cruise, the fairing is aligned with the propeller wake and the incoming high-speed flow. In transition, the propeller wake and the incoming flow are not aligned due to varying levels of crossflow. For a fixed fairing, this crossflow creates drag when not aligned with the flow.

Moreover, for any propeller, the spinner placed in the center of the propeller reduces drag in forward flight. During vertical flight, the spinner points upwards, having a bluff body behind it that creates an empty region beneath the hub that the air has to then fill in, thereby causing flow separation. Since there is no shape to guide the air to close in that wake, the air creates turbulence right behind the propeller which further decreases the efficiency of the propeller in vertical flight.

Embodiments address these and other problems, individually or collectively.

SUMMARY

Embodiments provide an aircraft configured for vertical takeoff and landing, the aircraft comprising: a fuselage; a wing coupled to the fuselage; a plurality of support structures coupled to the wing; a plurality of tilting propeller assemblies each coupled to a first end of a support structure and configured to transition between a vertical lift position and a forward flight position; each tilting propeller assembly among the plurality of tilting propeller assemblies comprising a propeller and a movable fairing provided downstream of the propeller, wherein the movable fairing is configured to extend along an axis of rotation of the propeller in the vertical lift position or the forward flight position, and the movable fairing is configured to swivel to extend parallel to a direction of resultant airflow over the tilting propeller assembly when the tilting propeller assembly transitions between the vertical lift position and the forward flight position.

According to various embodiments, the movable fairing may include a passive swiveling mechanism that aligns the movable fairing with a resultant airflow over the tilting propeller assembly. In some embodiments, the movable fairing may be configured to swivel with respect to the axis of rotation of the propeller. In other embodiments, the movable fairing may extend at an angle with respect to the top portion when the tilting propeller assembly is in transition between the vertical lift position and the forward flight position. In yet other embodiments, the movable fairing may include an opening (e.g., a cavity or slit) configured to receive a portion of the support structure.

Embodiments are further directed to a tilting propeller assembly coupled to a support structure of an aircraft wing and configured to transition between a vertical lift position and a forward flight position, the tilting propeller assembly comprising a propeller, and a movable fairing provided downstream of the propeller, wherein the movable fairing is configured to extend along an axis of rotation of the propeller in the vertical lift position or the forward flight position, and the movable fairing is configured to swivel with respect to the axis of rotation of the propeller to extend parallel to a direction of resultant airflow on the tilting propeller assembly when the tilting propeller assembly transitions between the vertical lift position and the forward flight position.

In various embodiments each tilting propeller assembly may be coupled to the first end of the support structure via a tilting mechanism. In some embodiments, the aircraft may comprise a control system configurable to control the plurality of tilting propeller assemblies between the vertical lift position and the forward flight position. In other embodiments, the aircraft may further comprise a plurality of lift propeller assemblies each coupled to a second end of the support structure.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1A:
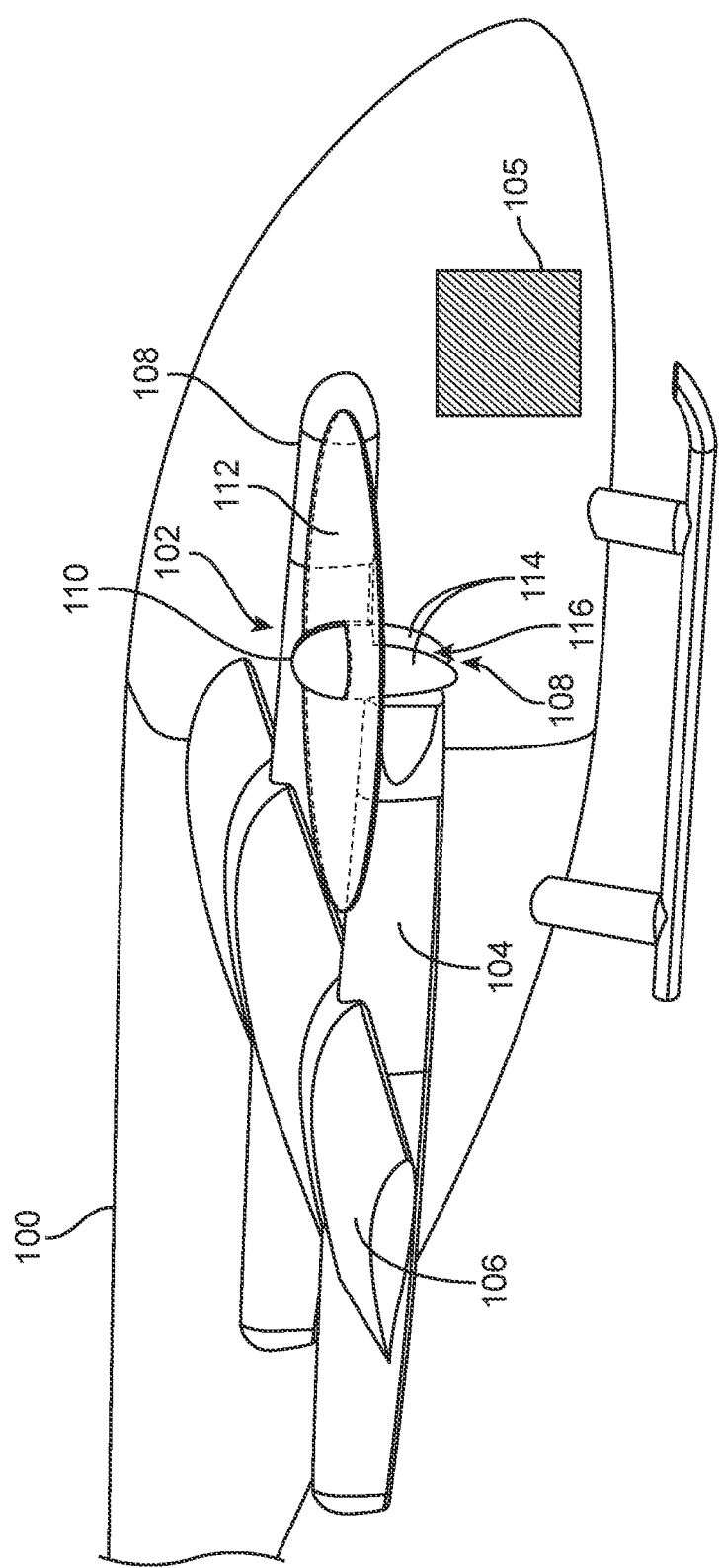
FIGS. 1A-1D illustrate an exemplary tilting propeller assembly having a movable fairing transitioning between a vertical flight configuration (illustrated in FIG. 1A) and a forward flight configuration (illustrated in FIGS. 1C-1D), according to various embodiments.

Techniques disclosed herein relate generally to an aircraft including a plurality of tilting propeller assemblies. More specifically, techniques disclosed herein provide a movable fairing provided at a first (e.g., lower) end of a tilting propeller assembly, shaped and dimensioned to accommodate a portion of a support structure of an electrically powered aircraft to which the tilting propeller assembly is coupled. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary," or "example" is not necessarily to be construed as preferred or advantageous over other embodiments or designs.

Embodiments provide an electric aircraft (e.g., an electric VTOL aircraft) including one or more tilting propeller assemblies (e.g., tilting fan assemblies) each coupled to a support structure (e.g., a boom) via a tilting mechanism. A movable fairing is provided at a first (e.g., lower) end of the tilting propeller assembly, shaped and dimensioned to accommodate a portion of the corresponding support structure to which the tilting propeller assembly is coupled. According to various embodiments, the movable fairing swivels with the tilting propeller assembly as the tilting propeller assembly transitions between a vertical flight configuration (e.g., hover position) and a forward flight configuration (e.g., cruise position). The movable fairing is configured to extend along an axis of rotation of the propeller in the vertical lift position or the forward flight position, and the movable fairing is configured to swivel to extend parallel to a direction of resultant airflow over the tilting propeller assembly when the tilting propeller assembly transitions between the vertical lift position and the forward flight position. In some embodiments, the electric aircraft may also include one or more lift fans in fixed positions (e.g., not tilting) for vertical flight.

According to various embodiments, the movable fairing may include a passive swiveling, lightly damped mechanism that would allow the movable fairing (which may be provided in form of a nacelle) to align with the airflow in a minimum drag orientation. The movable fairing is damped enough to prevent any oscillations from the propeller wake shedding, and, at the same time, keep the propeller aligned in a minimum drag orientation with the resultant flow.

The movable fairing described herein allows for the integration of an aerodynamic fairing with the supporting pylon structure of a propeller, for a variety types of propellers (e.g., tractor propellers, pusher propellers). The movable fairing comprises a light weight, carbon shell fairing, including room for cabling and internal propeller motor structure, which is configured to move with the tilting propeller assembly mechanism, while having the ability to swivel in alignment with the resultant flow when the tilting propeller assembly transitions between a forward flight configuration and a vertical flight configuration.

Figure 1B:
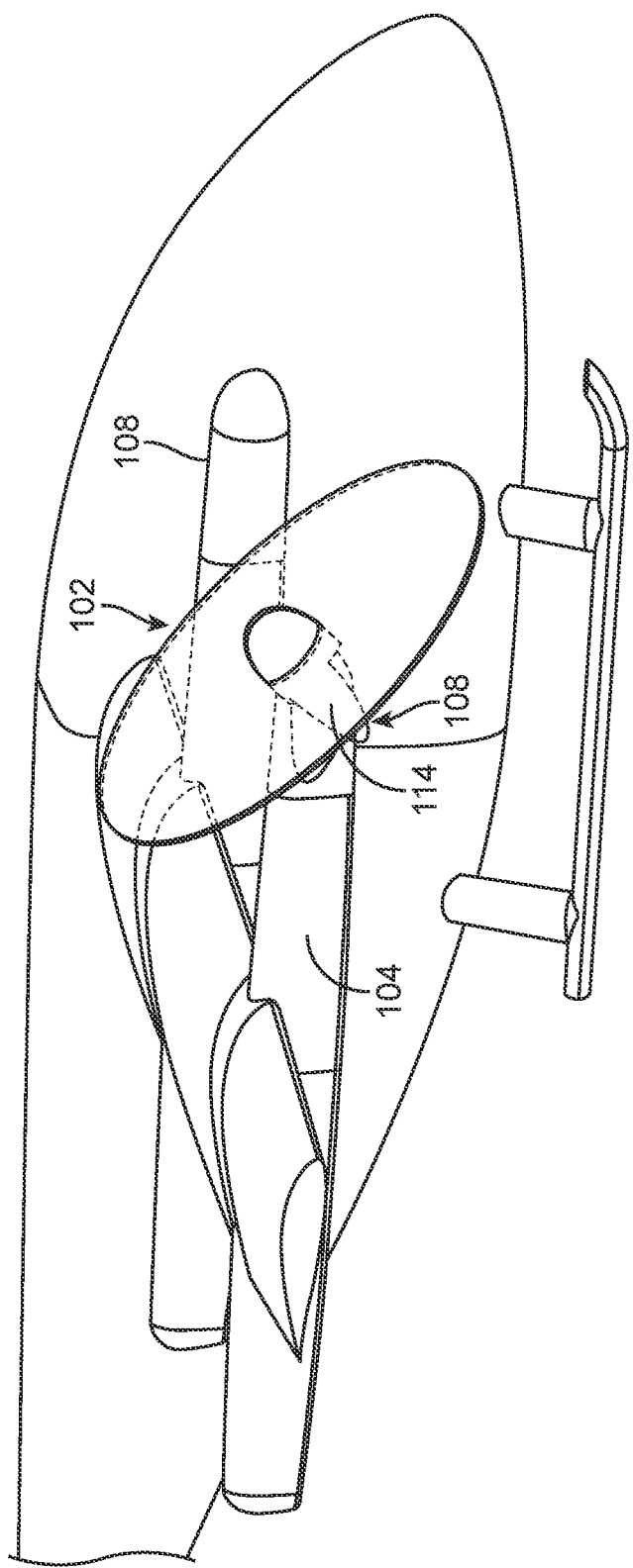
Figure 1C:
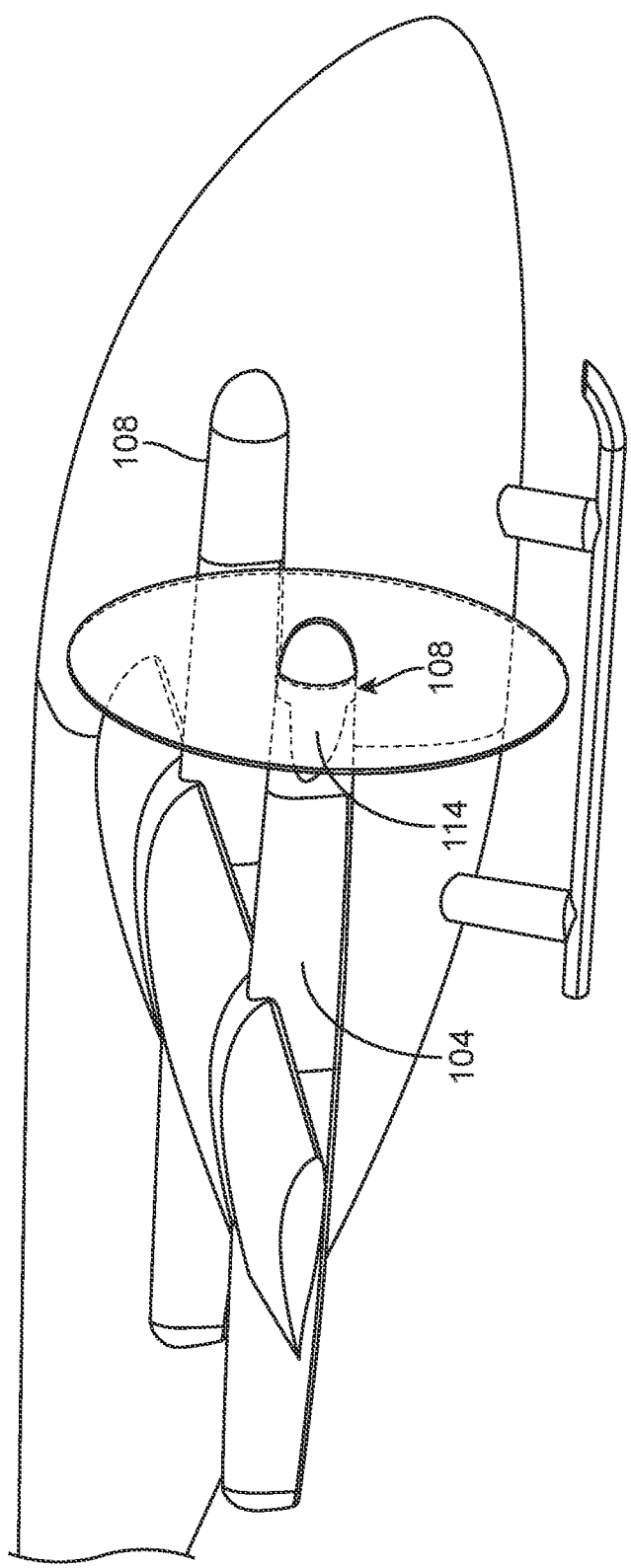
Figure 1D:
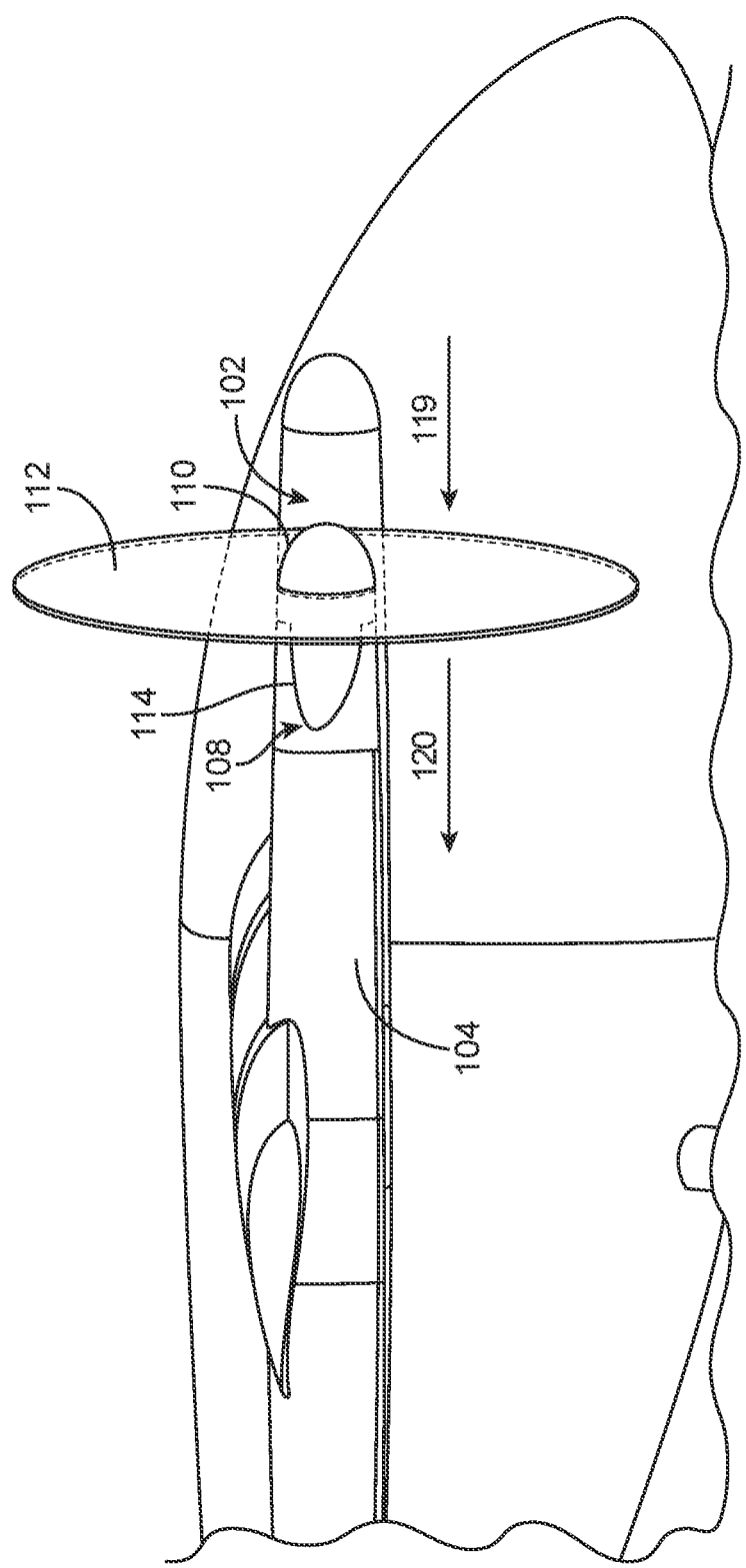

FIGS. 1A-1D illustrate an aircraft 100 with an exemplary tilting propeller assembly 102 transitioning between a vertical flight configuration (illustrated in FIG. 1A) and a forward flight configuration (illustrated in FIGS. 1C-1D). An exemplary aircraft 100 illustrated in FIG. 1A may include at least one tilting propeller assembly 102 coupled to a support structure 104 (e.g., a boom), which may be coupled to an underside of a wing 106. According to various embodiments, the support structure 104 may be coupled to the wing 106 in other configurations including but not limited to an upper side, leading edge, or trailing edge. The tilting propeller assembly 102 may be coupled to an end (e.g., front end) of the support structure 104 via a tilting mechanism. The tilting propeller assembly 102 may include a movable fairing 108 provided at a first end of the tilting propeller assembly 102. The movable fairing 108 may be provided opposite from a spinner 110 with respect to a propeller 112 of the tilting propeller assembly 102. For example, the movable fairing may be provided downstream from the propeller 112. In various embodiments, the movable fairing 108 may be comprised of one or more materials selected based on material characteristics. For example, an exemplary movable fairing 108 may include a lightweight carbon shell. The aircraft 100 may further include a control system 105 that controls the plurality of tilting propeller assemblies 102 (e.g., by controlling the tilting mechanisms) between the vertical lift position and the forward flight position.

An exemplary tilting propeller assembly 102 may include a combined rotor and motor. The rotor may comprise propeller blades 112 attached to a hub or may be manufactured as a single piece with an integral hub. The hub provides a central structure to which the blades connect, and in some embodiments is made in a shape that envelops the motor. In some embodiments one or more pieces of the motor are low-profile such that the entire motor fits within the hub of the rotor, presenting lower resistance to the air flow when flying forward. The rotor is attached to the rotating part of the motor. The stationary part of the motor is attached to the support structure or other part of the fuselage. In some embodiments the motor is a permanent magnet motor and is controlled by an electronic motor controller. The electronic motor controller sends electrical currents to the motor in a precise sequence to allow the rotor to turn at a desired speed or with a desired torque. The exemplary tilting propeller assembly 102 may have any suitable number of blades that may be oriented in a predetermined manner. For example, the exemplary tilting propeller assembly 102 may have 5 blades having a predetermined angle of attack.

According to various embodiments, the movable fairing 108 may include an opening 116 (e.g., one or more slits, cavities, and/or cutouts) for receiving the end of the support structure 104. The exemplary embodiment illustrated in FIG. 1A shows the movable fairing 108 having one or more prongs 114 that fit around the end of the support structure 104, where the area between the prongs 114 may be referred to as the opening 116. According to various embodiments, the opening 116 may be shaped and dimensioned to accommodate the end portion of the support structure 104. The opening 116 may be sufficiently sized to fit the end portion of the support structure 104, while also minimizing undesirable gaps between the support structure 104 and the one or more prongs 114 when the support structure 104 is set between the one or more prongs 114. For example, when the movable fairing 108 is in the forward flight configuration, the movable fairing 108 may appear flush to the support structure 104 (as shown in FIG. 1C). In some embodiments, the support structure 104 (e.g., the boom) may have a cylindrical cross-section, a circular cross-section, or an oval cross-section, such that to accommodate the support structure 104, the opening 116 of the movable fairing 108 is shaped and dimensioned to fit over the particular shape of the corresponding support structure 104. For example, to fit a support structure 104 with an oval cross-section, the one or more prongs 114 may be separated by the opening 116 configured to take into consideration the curvature of the oval cross-section. In various embodiments, the opening 116 may be further be configured to fit various aircraft components (e.g., circuitry, cabling, the internal propeller motor structure, etc.) in addition to accommodating the shape of the support structure 104. For example, the opening 116 may be configured to accommodate control cables in addition to the support structure 104.

The movable fairing 108 may include at least two or more prongs 114, where the two or more prongs 114 are configured to swivel with the tilting propeller assembly 102. In some embodiments, the two or more prongs 114 may be configured to swivel in tandem with each other. For example, the movable fairing 108 including the two or more prongs 114 may collectively swivel while the tilting propeller assembly 102 transitions between a vertical flight configuration and a forward flight configuration.

The movable fairing 108 described herein may be include passive mechanism that does not require a dedicated actuator and/or controller. The movable fairing 108 may follow the tilting propeller assembly 102 that is coupled to the movable fairing 108 and which is controlled by the control system 105 between the vertical lift position and the forward flight position. For example, the movable fairing 108 may include a passive swiveling, lightly damped mechanism that would allow the nacelle portion of the movable fairing 108 to align with the resultant airflow into a minimum drag orientation.

In some embodiments, mechanical components included in the movable fairing 108 may apply damping effects to prevent oscillations and maintain overall aircraft stability. Specifically, the movable fairing 108 may include a mechanism which applies damping forces as needed. As further shown in FIG. 2B, in some embodiments, the movable fairing 108 may include a torsion spring 216 to achieve a damping effect. For example, damping may be achieved by a torsion spring 216 provided at the center of the movable fairing 108 and/or coupled to an axis around which the movable fairing 108 swivels. Alternatively, two or more torsion springs 216 may be used to achieve a damping effect. For example, a first torsion spring 216 may be provided at the first side of the movable fairing 108 (e.g., coupled to a first prong 114) and a second torsion spring 216 may be provided at the second side of the movable fairing 108 (e.g., coupled to a second prong 114). In another embodiment, the movable fairing 108 may be damped through the use of one or more materials selected for their particular damping properties. For example, a portion of the movable fairing 108 may be constructed using a material chosen for its ideal damping characteristics. Furthermore, in various embodiments, a combination of materials and mechanical components may be used to achieve sufficiently damped movable fairings 108.

FIG. 1A illustrates the tilting propeller assembly 102 in a horizontal position (e.g., in a vertical flight configuration) where the tilting propeller assembly 102 generates lift for the aircraft 100. The movable fairing 108 illustrated in FIG. 1A provides a complete closeout for the downside of the tilting propeller assembly 102 under the spinner 110 in the vertical flight configuration (e.g., hover position), thereby increasing the hover efficiency.

In some embodiments, a control system 105 (e.g., a flight control system) may be coupled to the aircraft 100. The control system 105 may be configured to control one or more tilting propeller assemblies 102, including respective movable fairings 108. For example, the control system 105 may be configurable to control the tilting propeller assembly 102 to transition between the vertical flight configuration and the forward flight configuration. The control system 105 is described in more detail at a later point in the specification (See FIG. 5 discussion.

FIG. 1B illustrates the tilting propeller assembly 102 and the movable fairing 108 in a transition position from the vertical flight configuration to the forward flight configuration (or vice versa). Once the transition is complete, as shown in FIG. 1C, the movable fairing 108 is aligned with the support structure 104. In the forward flight configuration, illustrated in FIGS. 1C-1D, the movable fairing 108 line up against the sides of the support structure 104 such that no opening 116 (e.g., cutout or slit) is visible. In the forward flight configuration, the movable fairing 108 is aligned with the propeller wake and the incoming highspeed airflow 119. In transition (illustrated in FIG. 1B), the propeller wake and the incoming air flow 119 are not aligned due to the varying levels of crossflow. The crossflow creates drag for the tilting propeller assembly 102. According to embodiments, the movable fairing 108 swivels to assume an aligned position with respect to the resultant airflow 120, thereby reducing or eliminating the drag on the tilting propeller assembly 102.

FIG. 1D illustrates the tilting propeller assembly 102 and the movable fairing 108 in the forward flight configuration. In various embodiments, the tilting propeller assembly 102 is comprised of at least a top portion (e.g., spinner 110) and a bottom portion (e.g., movable fairing 108) which may include one or more prongs 114. The tilting propeller assembly 102 may be configured such that the top and bottom portions extend along the axis of rotation with respect to the propeller 112. As shown in FIG. 1D, the top portion of the tilting propeller assembly 102 may be provided upstream of the propeller 112 while the bottom portion may be provided downstream of the propeller 112. As used herein, the term upstream may refer to a location directed towards the source of the airflow. For example, when in the forward flight configuration, the top and bottom portions of the tilting propeller assembly 102 are on opposite sides of the propeller 112, where the top portion is in front of the propeller 112 (e.g., upstream) and the bottom portion is behind the propeller 112 (e.g., downstream).

According to various embodiments, the bottom portion of the tilting propeller assembly 102 (e.g., movable fairing 108) may transition between extending along the axis of rotation of the propeller 112 and being positioned at an angle with respect to the axis of rotation of the propeller 112. For example, when the tilting propeller assembly 102 is in the forward flight configuration, the movable fairing 108 may be provided along the same axis of rotation of the propeller 112. When the tilting propeller assembly 102 is in the vertical flight configuration, the movable fairing 108 may be provided at an angle with respect to the axis of rotation of the rotor. In some embodiments, as the movable fairing 108 of the tilting propeller assembly 102 swivels at an angle to the axis of rotation of the propeller 112, the top portion (e.g., the spinner 110) of the tilting propeller assembly 102 may remain located along the same axis of rotation as the rotor. Alternatively and/or additionally, the top portion of the tilting propeller assembly 102 may also move at an angle to the axis of rotation of the rotor as the bottom portion transitions between flight configurations.

Figure 2A:
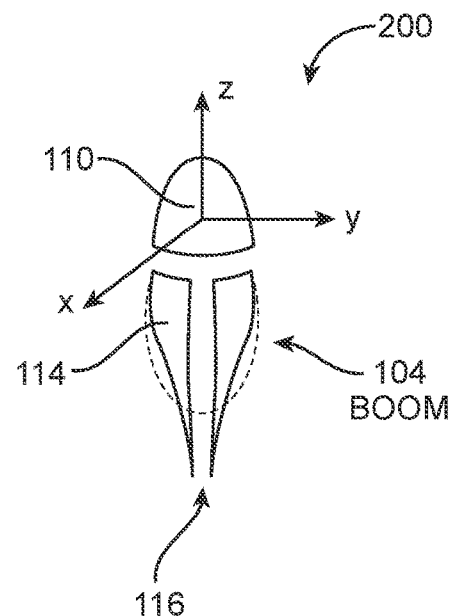
FIGS. 2A and 2B illustrate an exemplary fairing element comprising a movable fairing portion according to various embodiments.
Figure 2B:
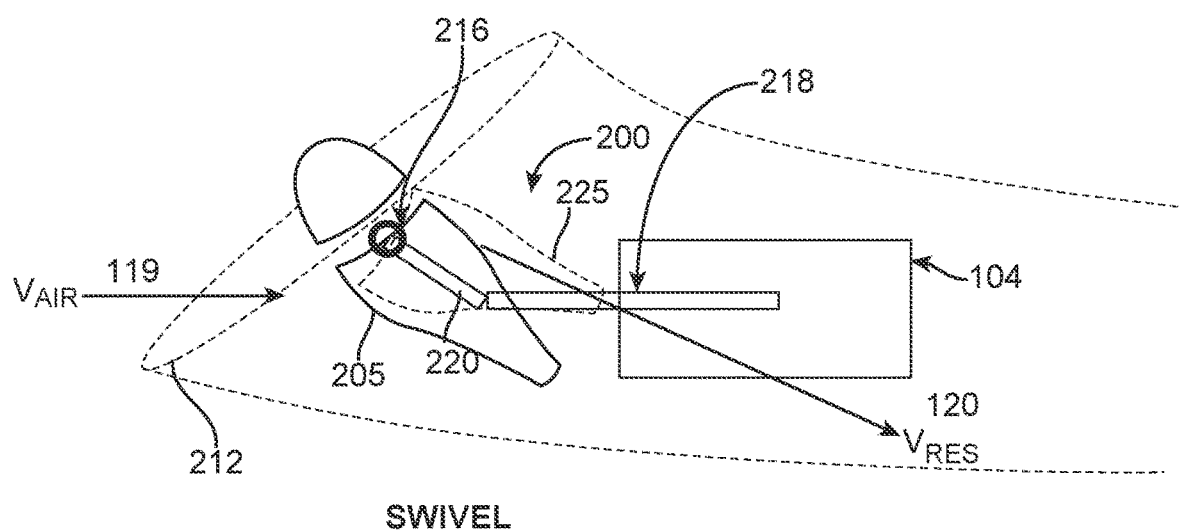

FIGS. 2A and 2B illustrate an exemplary fairing element 200 according to various embodiments. As shown in FIG. 2A, the fairing element 200 includes a top portion (e.g., a spinner 110) and a bottom portion (e.g., the nacelle portion, the movable fairing 205) that accommodates a support structure 104 therein. The movable fairing 205 may include one or more prongs 114 that are split via one or more openings 116 (e.g., cutouts or slits). The opening 116 may allow for storing cabling and/or the internal propeller motor structure, as well as, accommodating a portion of a support structure 104. Blades or a propeller 212 of the tilting propeller assembly 102 may be provided between the top portion (e.g., spinner 110) and the movable fairing 205 of the fairing element 200.

As shown in FIG. 2B, the movable fairing 205 may swivel with respect to the support structure 104 along with the transitioning of the propeller 212 between the vertical position (for cruise or forward flight configuration) and the horizontal position (for hover or vertical flight configuration). FIG. 2B illustrates the movable fairing 205 in a swiveled position 225 with respect to the propeller 212 as well as the linkage elements 218, 220 coupling the movable fairing 205 to the support structure 104. Accordingly, a passive swiveling mechanism may be used to align the movable fairing 205 with the resultant flow 120 over the tilting propeller assembly 102, such that a dedicated actuator and/or control mechanism is not needed (e.g., in addition to the actuator and control system 105 required to move the tilting propeller assembly 102 between the vertical flight and forward flight configurations).

In some embodiments, the movable fairing 205 may swivel by rotating with respect to a particular axis. For example, the passive swiveling mechanism may align the movable fairing 205 by swiveling the movable fairing 205 with respect to the axis of rotation of the propeller 212. Additionally and/or alternatively, the movable fairing 205 may swivel by pivoting at a particular point, such as at the torsion springs 216 coupling the movable fairing 205 to the linkage elements 220, 218.

In various embodiments, the movable fairing 205 may swivel in alignment with the resultant airflow 120, such that the movable fairing 205 may become parallel with and/or maintain being parallel with the resultant airflow 120, as shown with the swiveled position 225 in FIG. 2B. As a result, the propeller 212 may be aligned in a minimum drag orientation with the resultant airflow 120 even as the vector orientation of the resultant airflow 120 changes. The resultant airflow 120 being a vector quantity equivalent to the combined effect of the airflow 119 over the propeller 212 and the thrust generated by the propeller 212.

As previously discussed, the movable fairing 108 may include one or more torsion springs 216 to achieve a damping effect. In some embodiments, the torsion spring(s) 216 may be coupled to an axis around which the movable fairing 108 swivels. As shown in FIG. 2B, the movable fairing 108 may be coupled to the support structure 104 via one or more linkage elements 218, 220 (e.g., linkage rods). A first linkage element 218 may be fixedly coupled to the support structure 104. A second linkage element 220 may be movably coupled to the first linkage element 218. The movable fairing 108 may be coupled to the second linkage element 220 via one or more torsion springs 216. The linkage elements 218, 220 and the torsion spring(s) 216 form the passive swiveling mechanism that aligns the movable fairing 108 with the resultant airflow 120 over the tilting propeller assembly. The movable fairing 108 swivels with respect to the propeller 212 and the second linkage element 220, assuming a position 225 that aligns with the resultant air flow 120. When the movable fairing 108 swivels with respect to the second linkage element 220 (e.g., the axis around which the movable fairing 108 swivels), the torsion spring(s) 216 apply damping forces on the movable fairing 108. As a result, excessive oscillation is prevented, and thus overall aircraft stability is maintained.

Figure 3A:
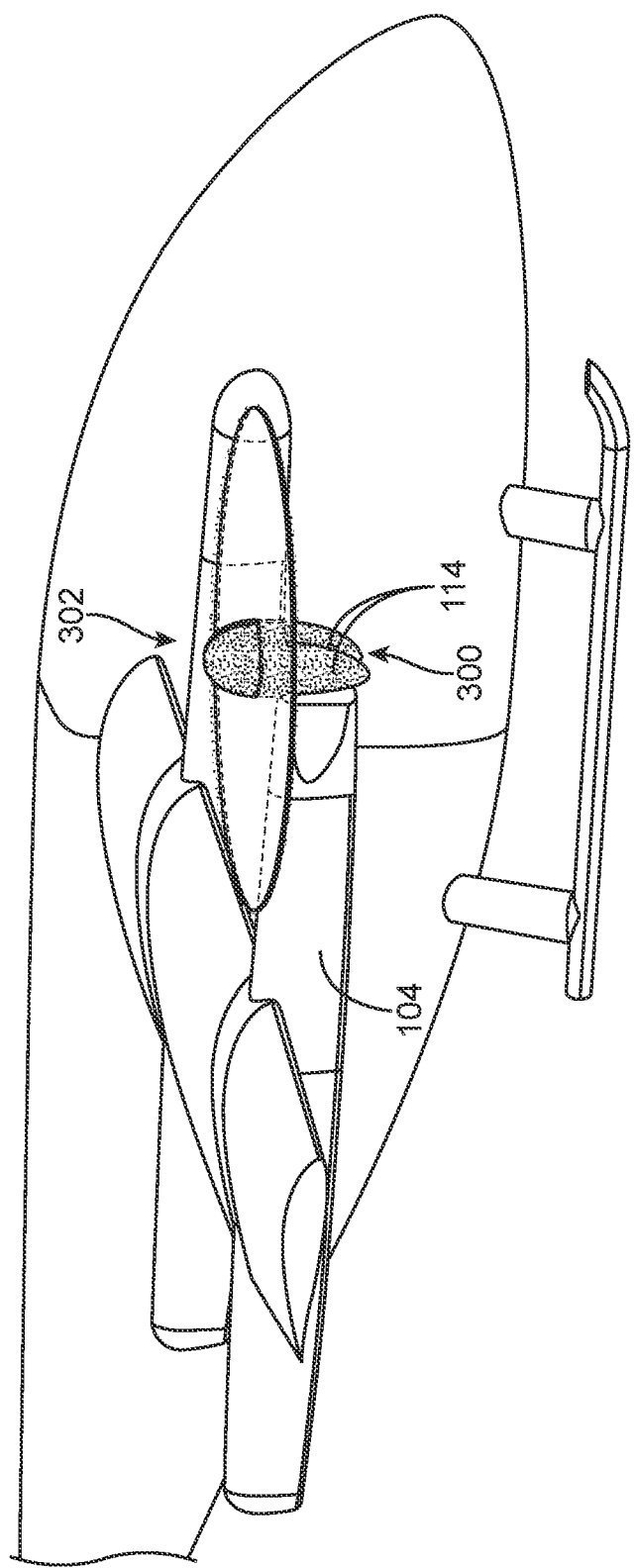
FIGS. 3A-3C illustrate an exemplary tilting propeller assembly transitioning between a vertical flight configuration (illustrated in FIG. 3A) and a forward flight configuration (illustrated in FIG. 3C), according to various embodiments.
Figure 3B:
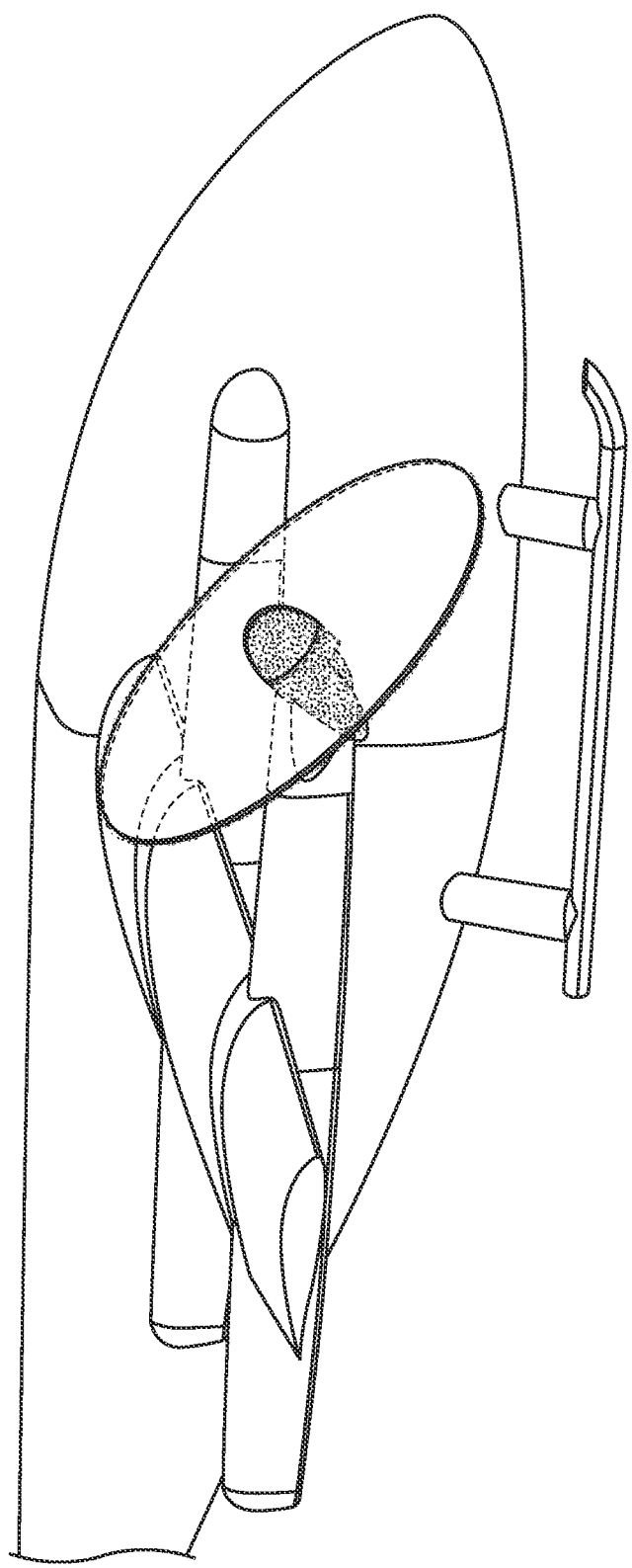
Figure 3C:
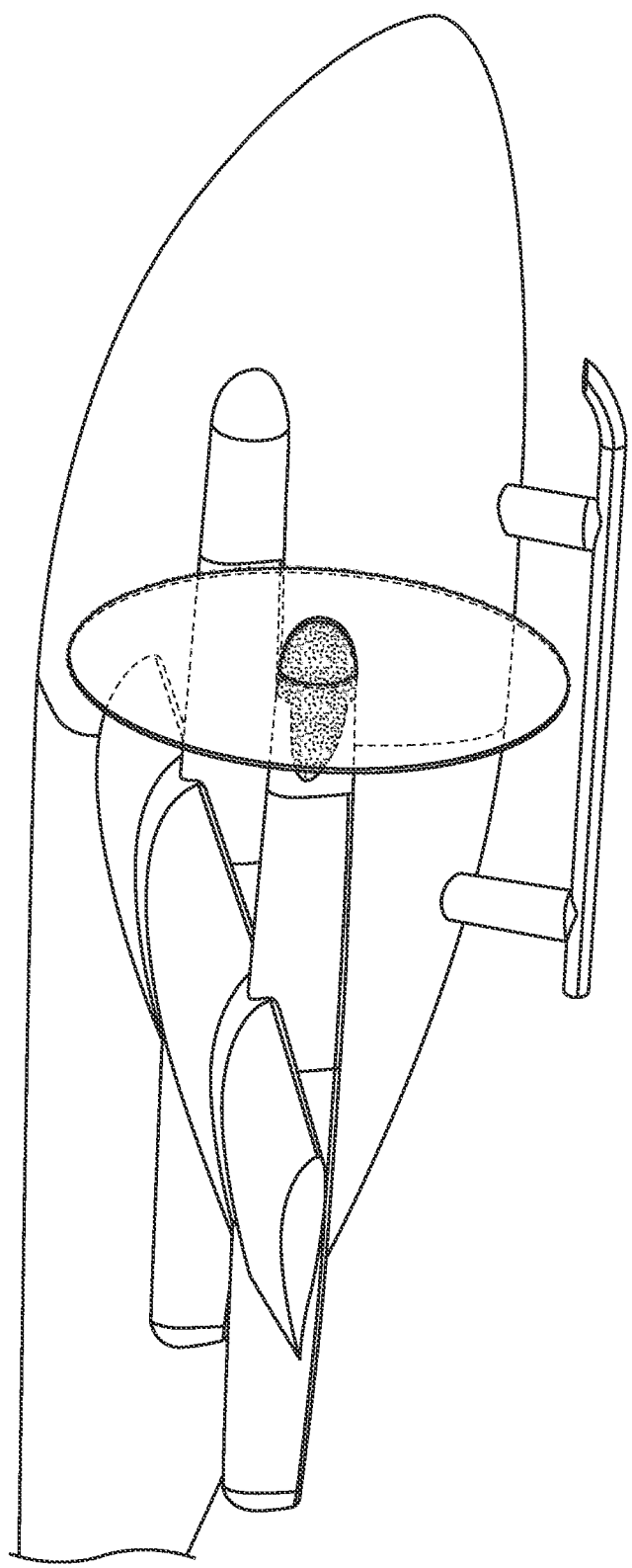

FIGS. 3A-3C illustrate the exemplary tilting propeller assembly 302 transitioning between a vertical flight configuration (illustrated in FIG. 3A) and a forward flight configuration (illustrated in FIG. 3C). The tilting propeller assembly 302 and the movable fairing 300 are shown in color to better illustrate the movement of these components.

The movable fairing 300 may include one or more prongs 114 configured to accommodate a support structure 104. According to various embodiments, the support structure 104 may include at least an angled top portion and an angled bottom portion. The one or more prongs 114 may be configured to accommodate the top and bottom portions of the support structure 104. For example, a first section of the one or more prongs 114 coupled to the top portion of the support structure 104 may be configured to accommodate the angle of the top portion, while a second section of the one or more prongs 114 coupled to the bottom portion of the support structure 104 may be configured to accommodate the angle of the bottom portion.

Figure 4A:
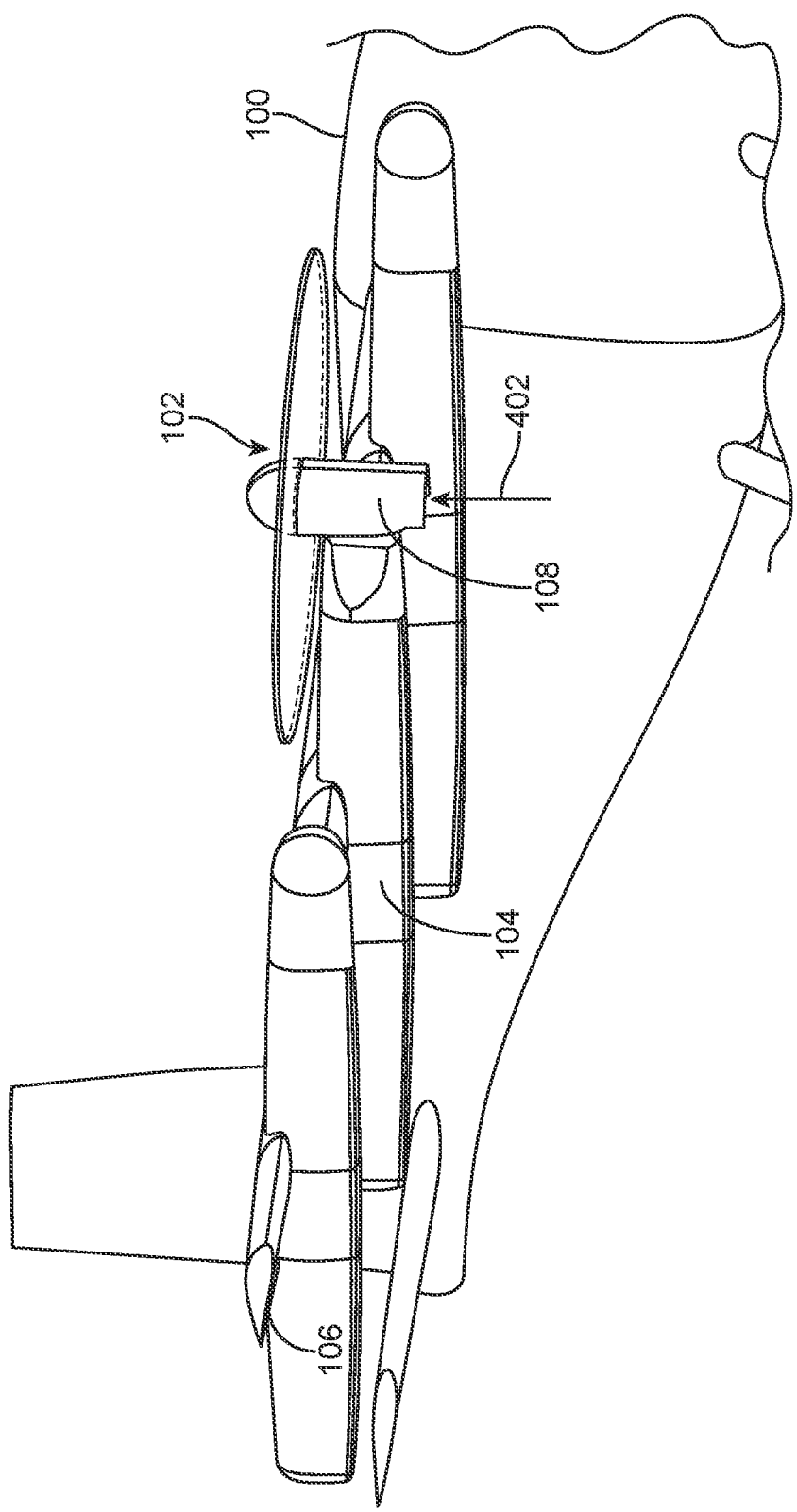
FIGS. 4A-4C illustrate another exemplary tilting propeller assembly transitioning between a vertical flight configuration (illustrated in FIG. 4A) and a forward flight configuration (illustrated in FIG. 4C), according to various embodiments.
Figure 4B:
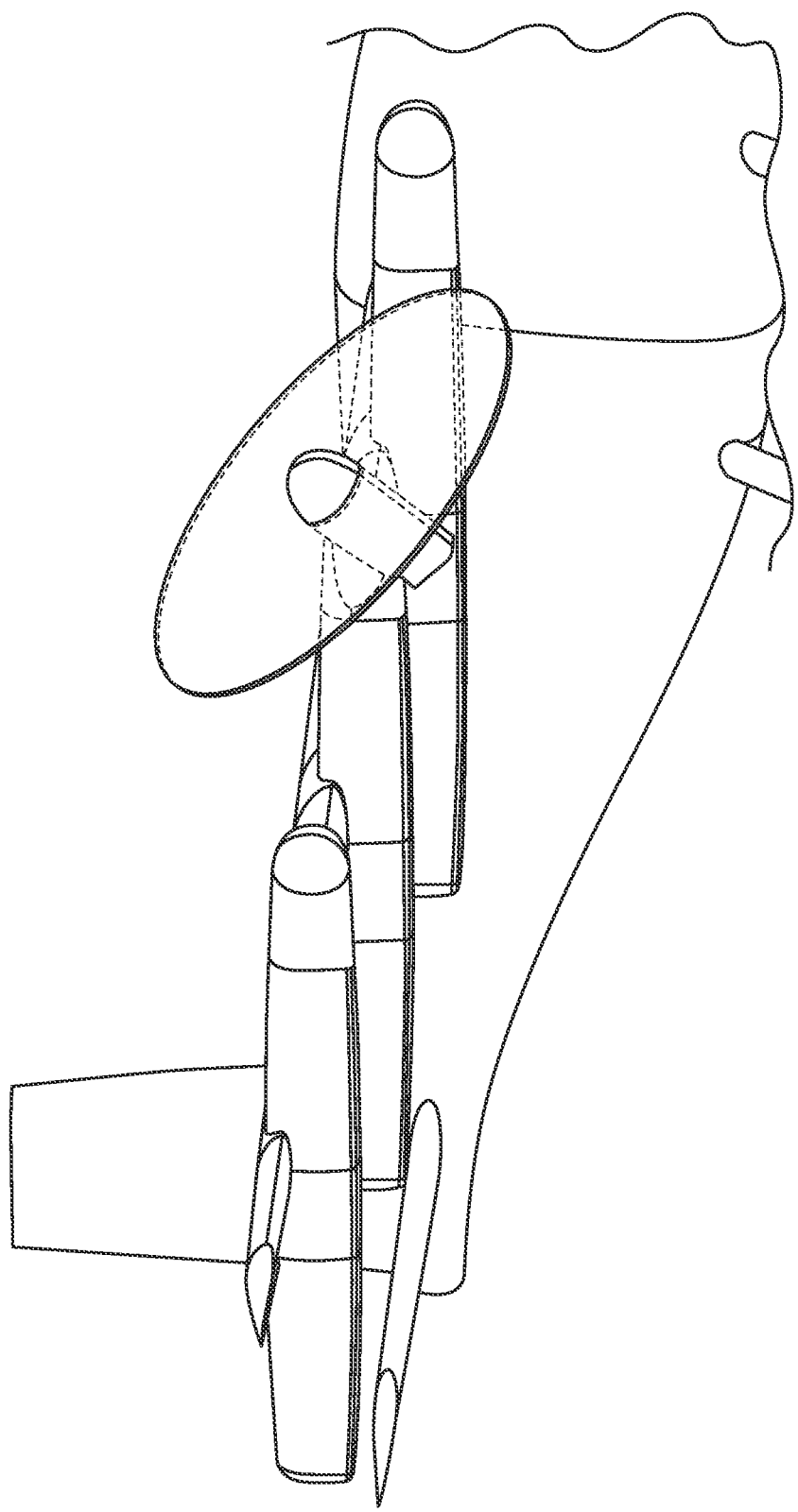
Figure 4C:
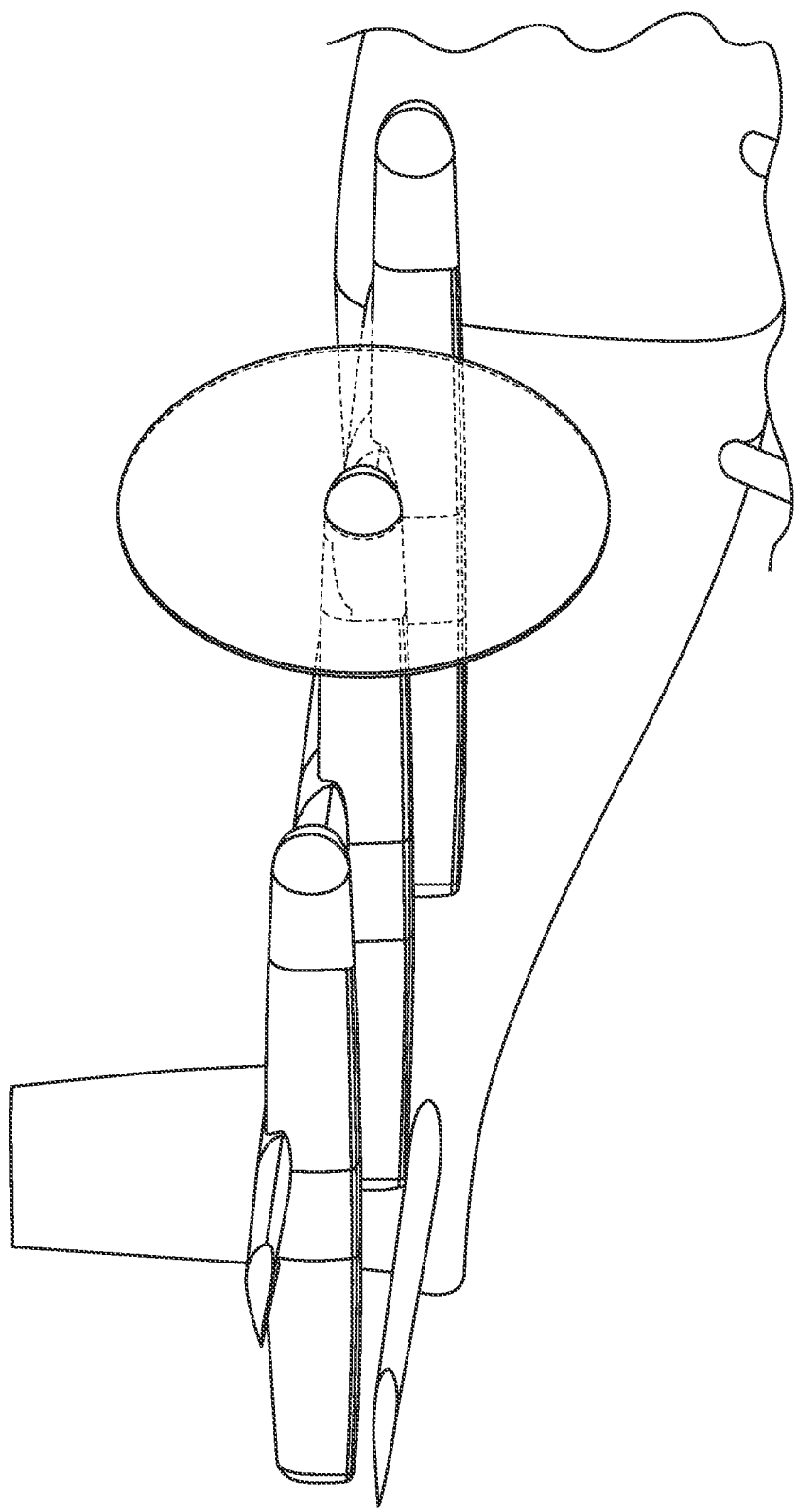

FIGS. 4A-4C illustrate another exemplary tilting propeller assembly 102 transitioning between a vertical flight configuration (illustrated in FIG. 4A) and a forward flight configuration (illustrated in FIG. 4C). In the embodiment illustrated in FIGS. 4A-4C, the opening 402 of the exemplary fairing 300 is provided as an internal cavity of the movable fairing 300 provided in a semi-circular shape that goes around an end of the support structure 104 such that a top side of the movable fairing 300 facing the end of the support structure 104 is open. When the tilting propeller assembly 102 tilts into the forward flight configuration (illustrated in FIG. 4C), the movable fairing 300 attaches to an underside of the end of the support structure 104, and a top side of the movable fairing 300 is flush with an upper side of the support structure 104.

According to various embodiments, the movable fairing 300 is coupled to a back of the motor and moves along with the tilting propeller assembly 102. Accordingly, the movable fairing 300 would remain in an off-axis position if the propeller 212 itself is in an off-axis position.

As further shown in FIGS. 1A-ID and 4A-4C, the tilting propeller assembly 102 including a movable fairing 108 can be placed on any support structure 104 coupled to the wing 106 of the aircraft 100. For example, FIGS. 1A-1D illustrate the tilting propeller assembly 102 including the movable fairing 108 on the outermost support structure 104 and FIGS. 4A-4C illustrate the tilting propeller assembly 102 including the movable fairing 108 on the middle support structure 104. According to various embodiments, a tilting propeller assembly 102 including a movable fairing 108 may be coupled to all support structures 104 (e.g., a front end of all booms, a back end of all booms, or a combination thereof) of the aircraft 100 via a tilting mechanism. In some embodiments, one or more tilting propeller assemblies 102 including a movable fairing 108 may be coupled to one or more support structures 104 (e.g., booms) of the aircraft 100. An exemplary configuration with multiple tilting propeller assemblies and corresponding movable fairing is shown in and described in connection with FIG. 5.

According to various embodiments, the VTOL aircraft may also include at least one lift propeller assembly mounted in a fixed position relative to the wing 106 to move the aircraft 100 in a vertical direction. For example, a lift propeller assembly may be coupled to a first end of each support structure 104, and a tilting propeller assembly 102 may be coupled to a second end of each support structure 104. A movable fairing 108 may be coupled to the tilting propeller assembly 102, shaped and dimensioned to accommodate a portion (e.g., an end) of the support structure 104. In some embodiments, the plurality of lift propeller assemblies are provided at a trailing edge of the wing 106 and the plurality of tilting propeller assemblies 102 are provided at a leading edge of the wing 106.

According to various embodiments, the aircraft 100 may be an autonomous aircraft. For example, the aircraft 100 may include an autonomous electric vertical takeoff and landing (eVTOL) aircraft.

Figure 5A:
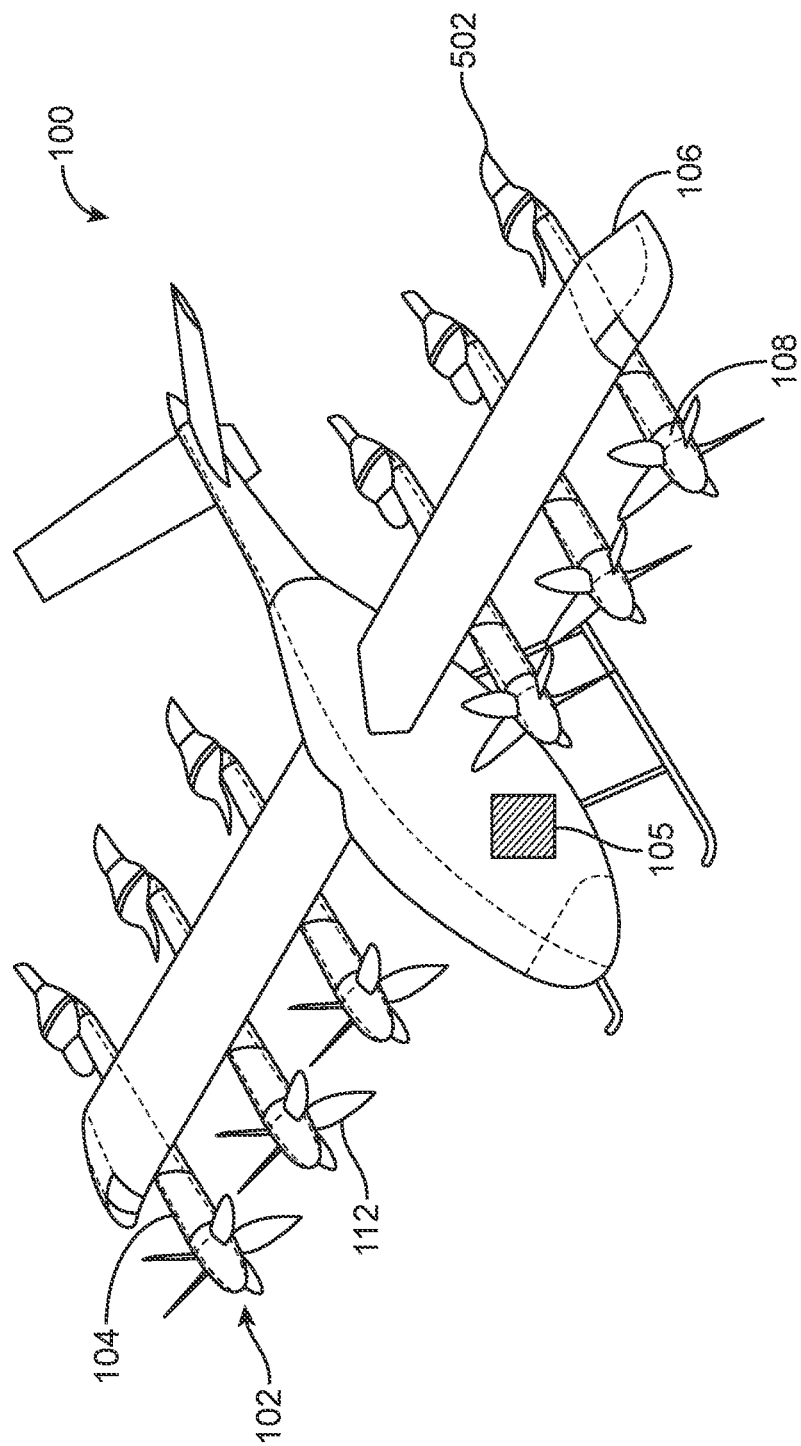
FIGS. 5A-5B illustrates an exemplary aircraft with tilting propeller assemblies in a forward flight configuration (illustrated in FIG. 5A) and in a vertical flight configuration (illustrated in FIG. 5B), according to various embodiments.
Figure 5B:
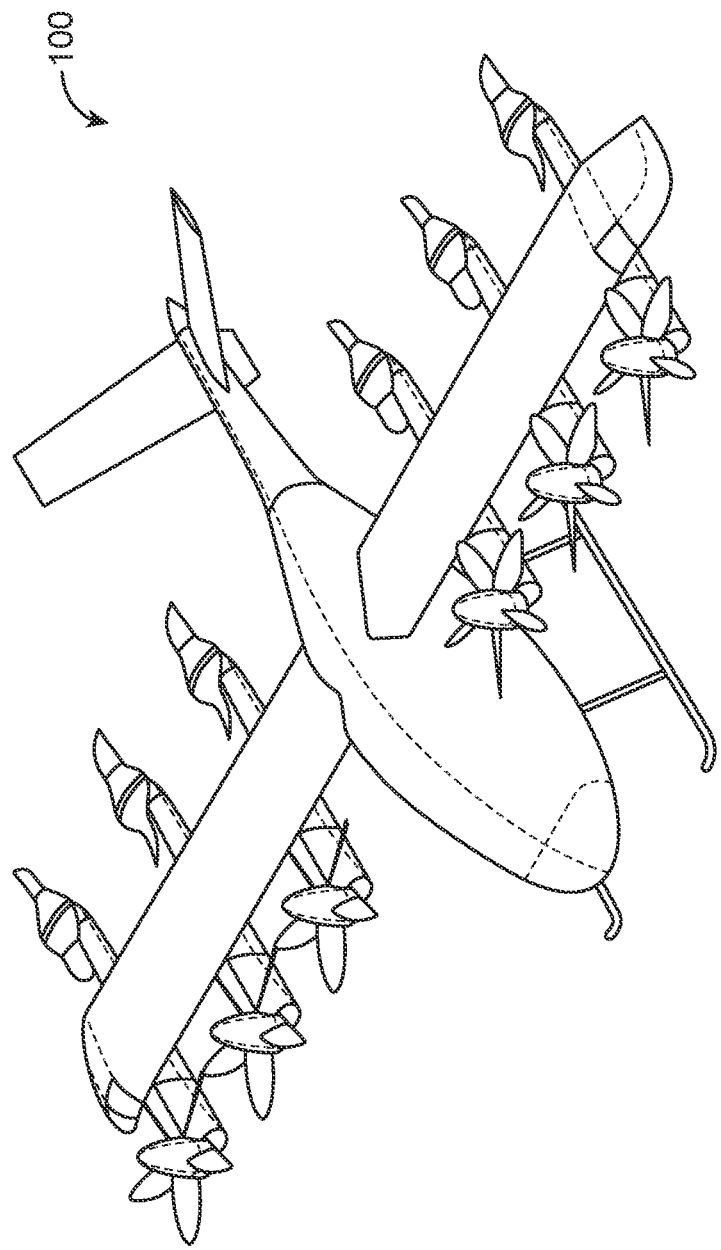

FIGS. 5A-5B illustrates an exemplary aircraft 100 with tilting propeller assemblies 102 in a forward flight configuration (illustrated in FIG. 5A) and in a vertical flight configuration (illustrated in FIG. 5B), according to various embodiments. In some embodiments, the aircraft 100 may include a plurality of support structures 104 (e.g., booms) and a plurality of tilting propeller assemblies 102, such that each support structure 104 is coupled to a tilting propeller assembly 102.

As previously discussed, a control system 105 may be coupled to the aircraft 100 and configured to control the tilting propeller assemblies 102. In some embodiments, the control system 105 may receive flight data from one or more sensors (e.g., sensors measuring air temperature, electric motor temperature, airspeed of the aircraft, etc.), computers, and other input/output devices coupled to the aircraft 100. Based on the flight data, the control system 105 may issue commands to change the positions of the tilting propeller assemblies 102 and, in turn, the movable fairings 108.

According to various embodiments, the control system 105 may be configured to control the tilting propeller assemblies 102 simultaneously, such that the position of all the movable fairings 105 coupled to the aircraft 100 are in the same position at the same time. Alternatively and/or additionally, the control system 105 may be configured to send individualized commands to cause each tilting propeller assembly 102 to move independently of each other. Thus, the control system 105 may identify one or more tilting propeller assemblies 102 and control the identified tilting propeller assemblies 102 independently from the rest of the tilting propeller assemblies 102. For example, a command may be issued from the control system 105 causing two out of four tilting propeller assemblies 102 to transition to the vertical flight configuration while the other tilting propeller assemblies 102 remain in the forward flight configuration. Alternatively and/or additionally, the control system 105 may cause the tilting propeller assemblies 102 to each move to an independent location between the vertical and forward flight configurations. In some embodiments, the control system 105 may use symmetric and/or asymmetric tilting to augment control during hovering and transition (e.g., transition between vertical and forward flight configurations). The additional degree of freedom of tilting may augment control during motor out and nominal conditions.

Furthermore, in various embodiments, the control system 105 may be configurable to receive a flight instruction, such as a takeoff, hover, cruise, or landing instruction. The control system 105 may then determine a position of the plurality of tilting propeller assemblies 102, and one or more of the plurality of the tilting propeller assemblies 102 between the vertical and forward flight configurations based on the flight instruction. During the operation of the aircraft 100, the control system 105 may be configurable to continuously monitor the position of the plurality of tilting propeller assemblies 102 in view of the flight instructions.

As previously discussed, the movable fairing 108 may swivel in alignment with the resultant airflow 120, such that the movable fairing 108 may become parallel with and/or maintain being parallel with the resultant airflow 120. In various embodiments, based on similar resultant airflow 120 on each tilting propeller assembly 102, each movable fairing 108 may be positioned similarly to align with the resultant airflow 120. For example, the movable fairings 108 may be arranged parallel to each other as they align with the resultant airflow 120. Alternatively, the resultant airflow 120 on each tilting propeller assembly 102 may be different due to the position of the propeller 112 on the wing 106 (e.g., other propellers 112 may impact the resultant airflow 120 over a neighboring propeller 112 on the wing 106). Accordingly, each movable fairing 108 may swivel to align with the resultant airflow 120 over the corresponding propeller 112 and, therefore, may assume a position that is not parallel to the movable fairing 108 of the neighboring propeller 112.

According to various embodiments, the aircraft 100 may include one or more lift fan assemblies 502 coupled to a plurality of support structures 104. In some embodiments, each lift fan assembly 502 may be provided at an end of a support structure 104. For example, each support structure 104 may include a lift fan assembly 502 coupled to an end of the support structure 104 aft of the wing 106. Moreover, in some embodiments, one or more of the plurality of support structures 104 may include at least one lift fan assembly 502 and one tilting propeller assembly 102. The lift fan assemblies 502 and the tilting propeller assemblies 102 may be coupled to the plurality of support structures 104 at various locations. For example, a tilting propeller assembly 102 may be coupled to the end of a support structure 104 in front of the wing 106, while the lift fan assembly 502 may be coupled to the end of the support structure 104 aft of the wing 106, or vice versa. Furthermore, in some embodiments, each support structure 104 may include the same combination of lift fan assemblies 502 and tilting propeller assemblies 102 at the same locations on the support structure 104. Alternatively and/or additionally, each support structure 104 may include a varying combination of lift fan assemblies 502 and/or tilting propeller assemblies 102 at differing locations on the support structures 104. For example, a first support structure may have a tilting propeller assembly 102 at a first end of the support structure 104, while a second support structure may have a tilting propeller assembly 102 at the first end of the support structure 104 and a lift fan assembly 502 at a second end of the support structure.

In the foregoing specification, embodiments of the disclosure have been described with reference to numerous specific details that can vary from implementation to implementation. For illustrative purposes, FIGS. 5A-5B provides an exemplary aircraft 100 configuration depicting multiple support structures 104 and tilting propeller assemblies 102. However, for simplicity, fewer support structures 104 and tilting propeller assemblies 102 are depicted in FIGS. 1A-4C to ensure ease of reading. One of ordinary skill in the art will appreciate that the number and location of the support structures 104 and tilting propeller assemblies 102 is not limited to what is illustrated in FIGS. 1A-5 and that the aircraft 100 may include more or fewer support structures 104 and/or tilting propeller assemblies 102. Therefore, the specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. An aircraft configured for vertical takeoff and landing, the aircraft comprising:
    a fuselage;
    a wing coupled to the fuselage;
    at least one support structure coupled to the wing; and
    at least one tilting propeller assembly coupled to a first end of a support structure and configured to transition between a vertical lift position and a forward flight position, wherein:
        the at least one tilting propeller assembly comprises a propeller and a movable fairing provided downstream of the propeller,
        the movable fairing includes an opening extending parallel to the support structure in the forward flight position and configured to receive at least a portion of the support structure therein, and
        the movable fairing is configured to swivel with respect to an axis of rotation of the propeller to extend parallel to a direction of resultant airflow over the at least one tilting propeller assembly when the at least one tilting propeller assembly transitions between the vertical lift position and the forward flight position.

2. The aircraft of claim 1, wherein the opening forms an internal cavity of the movable fairing having a semi-circular shape.

3. The aircraft of claim 1, wherein the movable fairing is provided under the support structure.

4. The aircraft of claim 1, wherein a top surface of the movable fairing is aligned with an upper side of the support structure in the forward flight position.

5. The aircraft of claim 1, wherein the movable fairing includes a passive swiveling mechanism that aligns the movable fairing with the resultant airflow over the tilting propeller assembly.

6. The aircraft of claim 1, further comprising:
    a lift propeller assembly coupled to a second end of the support structure.

7. The aircraft of claim 1, wherein the tilting propeller assembly includes a top portion provided upstream of the propeller, wherein the top portion extends along the axis of rotation of the propeller.

8. The aircraft of claim 7, wherein the movable fairing extends at an angle with respect to the top portion when the tilting propeller assembly is in transition between the vertical lift position and the forward flight position.

9. The aircraft of claim 1, wherein the movable fairing comprises a light weight, carbon shell.

10. The aircraft of claim 1, wherein the tilting propeller assembly is coupled to the first end of the support structure via a tilting mechanism.

11. The aircraft of claim 1, wherein:
in the vertical lift position, the tilting propeller assembly creates a vertical lift for the aircraft, and
in the forward flight position, the tilting propeller assembly creates a forward push for the aircraft.

12. The aircraft of claim 1, further comprising:
a control system configurable to control the at least one tilting propeller assembly between the vertical lift position and the forward flight position.

13. A tilting propeller assembly coupled to a support structure of an aircraft wing and configured to transition between a vertical lift position and a forward flight position, the tilting propeller assembly comprising:
a propeller, and
a movable fairing provided downstream of the propeller, wherein
the movable fairing includes an opening extending parallel to the support structure in the forward flight position and configured to receive at least a portion of the support structure therein, and
the movable fairing is configured to swivel with respect to an axis of rotation of the propeller to extend parallel to a direction of resultant airflow over the tilting propeller assembly when the tilting propeller assembly transitions between the vertical lift position and the forward flight position.

14. The tilting propeller assembly of claim 13, wherein the tilting propeller assembly includes a top portion provided upstream of the propeller, wherein the top portion extends along the axis of rotation of the propeller.

15. The tilting propeller assembly of claim 14, wherein the movable fairing extends at an angle with respect to the top portion when the tilting propeller assembly is in transition between the vertical lift position and the forward flight position.

16. The tilting propeller assembly of claim 13, wherein the movable fairing includes one or more torsion springs that apply damping on the movable fairing when the movable fairing swivels with respect to the propeller.

17. The tilting propeller assembly of claim 13, wherein the movable fairing includes a passive swiveling mechanism that aligns the movable fairing with the resultant airflow over the tilting propeller assembly.

18. The tilting propeller assembly of claim 13, wherein the opening forms an internal cavity of the movable fairing having a semi-circular shape.

19. The tilting propeller assembly of claim 13, wherein a top surface of the movable fairing is aligned with an upper side of the support structure in the forward flight position.

* * * * *